US006726415B2

(12) United States Patent
Jakob et al.

(10) Patent No.: US 6,726,415 B2
(45) Date of Patent: Apr. 27, 2004

(54) ACTUATING DEVICE FOR A TOOL OR WORKPIECE TENSIONING JACK IN A MACHINE TOOL SPINDLE

(75) Inventors: Ludwig Jakob, Kleinwallstadt (DE); Josef Greif, Friesenried (DE)

(73) Assignee: Ott-Jakob GmbH & Co. Spanntechnik KG, Lengenwang (DE)

( * ) Notice: Subject to any disclaimer, the term of this patent is extended or adjusted under 35 U.S.C. 154(b) by 89 days.

(21) Appl. No.: 10/111,940

(22) PCT Filed: Aug. 25, 2001

(86) PCT No.: PCT/EP01/09820

§ 371 (c)(1), (2), (4) Date: Jul. 11, 2002

(87) PCT Pub. No.: WO02/18081

PCT Pub. Date: Mar. 7, 2002

(65) Prior Publication Data

US 2002/0182024 A1 Dec. 5, 2002

(30) Foreign Application Priority Data

Sep. 1, 2000 (DE) ........................................ 100 43 006

(51) Int. Cl.[7] ............................ B23C 5/26; B23B 31/30

(52) U.S. Cl. ...................... 409/233; 409/135; 279/4.01; 408/239 R

(58) Field of Search ......................... 409/233, 231–232; 408/239 R; 279/900, 141, 4.01, 4.04; 82/162, 165

(56) References Cited

U.S. PATENT DOCUMENTS

| | | | | |
|---|---|---|---|---|
| 3,625,530 A | * | 12/1971 | Parsons | 409/233 |
| 4,008,647 A | * | 2/1977 | Hague et al. | 409/233 |
| 4,319,516 A | | 3/1982 | Rohm | |
| 5,707,186 A | | 1/1998 | Gobell et al. | |
| 6,604,269 B2 | * | 8/2003 | Jennemann et al. | 409/135 |

FOREIGN PATENT DOCUMENTS

| | | | |
|---|---|---|---|
| EP | 0 967 039 A2 | | 12/1999 |
| EP | 1254739 A1 | * | 11/2002 |
| FR | 2579498 A1 | * | 10/1986 |

* cited by examiner

*Primary Examiner*—Erica Cadugan
(74) *Attorney, Agent, or Firm*—Martin Fleit; Paul D. Bianco; Fleit Kain Gibbons Gutman Bongini & Bianco P.L.

(57) ABSTRACT

The invention relates to an actuating device for a tool or a workpiece tensioning jack in a machine tool spindle. The actuating device includes a pressure piston which is arranged inside a housing for actuating the tool or workpiece tensioning jack. In order to provide a compact, space-saving actuating device enabling leakage fluid to be drained off in a simple manner, several interspaced continuous bores are arranged concentrically around a center axis in a side wall of the housing. Pressure plungers which are axially displace-able with the aid of the pressure piston are disposed therein and the housing contains at least one leakage channel with a section extending between the pressure plungers in a radially outer direction.

11 Claims, 3 Drawing Sheets

ACTUATING DEVICE FOR A TOOL OR WORKPIECE TENSIONING JACK IN A MACHINE TOOL SPINDLE

FIELD OF THE INVENTION

The invention pertains to an actuating device for a tool or a workpiece tensioning jack in a machine tool spindle.

BACKGROUND OF THE INVENTION

The working spindles of machine tools or processing centers as a rule have an integrated tool tensioning jack for automatic tensioning and release of the processing tools. In the conventional tool tensioning jacks, the tools are usually held by a tensioning grasper which is located at the front end of a tensioning rod which is tensioned by a cup spring packet and engages in a corresponding tightening bolt of the tools or tool holder. To release the tools, the tensioning rod is displaced by a usually hydraulically actuated piston-cylinder unit opposite the tensioning force of the cup spring packet, so that the tensioning jaw is opened and the tool is released. Often an inner coolant inlet is provided so that the lubricating coolant can be directed to the tool, for example, via the hollow tensioning rod through the interior of the working spindle. But in this case, the lubricating coolant has to be sent through a suitable device from a stationary connecting piece into the rotating parts during the processing. As a rule, this occurs through so-called rotary lead throughs, in which the transition between the fixed and rotating parts takes place by means of sealing rings that slide upon each other. In order to achieve a particularly space-saving and compact design, the rotary lead through can be integrated within the actuating device for the tool tensioning jack. However, since this kind of rotary lead through is not entirely leak-proof and leakage of the lubricating coolant may occur in particular at the connecting point between the stationary and rotating parts, the problem that occurs primarily in the compact design is to ensure a suitable removal of the leakage fluid.

From DE 195 43 612 C1 a similar actuating device is known for a tool or workpiece tensioning jack which contains a pressure piston which is arranged inside a housing for actuating the tensioning rod which is pretensioned by a set of springs. Integrated into this actuating device there is a rotary lead through which contains a first slide washer joined with the tensioning rod, and a second slide washer located in a separate sealing part. The pressure piston designed as ring piston is located in a cylinder that will move axially in a fixed machine part. If the ring piston is placed under pressure within the cylinder, then the piston will be braced against the spindle by means of internal engaging elements and exert a corresponding counter-force on the axially moving cylinder. In this manner, the tension rod and also the rotary lead through will be moved along.

It is the purpose of the invention to create a compact and space-saving actuating device of the kind described above, which makes possible a simple removal of leakage fluid.

SUMMARY OF THE INVENTION

The invention relates to an actuating device for a tool or a workpiece tensioning jack in a machine tool spindle. The actuating device includes a pressure piston which is arranged inside a housing for actuating the tool or workpiece tensioning jack. In order to provide a compact, space-saving actuating device enabling leakage fluid to be drained off in a simple manner, several interspaced continuous bores are arranged concentrically around a center axis in a side wall of the housing. Pressure plungers which are axially displaceable with the aid of the pressure piston are disposed therein and the housing contains at least one leakage channel with a section extending between the pressure plungers in a radially outer direction.

Due to the interspaced placement of the pressure plungers there will be space between them for the passage of one or more leakage bores or channels, into which any leakage fluid can flow off without back-pressure and it can be collected there or removed through corresponding lines. In particular in the vertical position of a machine tool spindle, the leakage fluid will flow by gravity downward and can be released at appropriate intervals or it can be moved off continuously through suitable lines as needed. The actuating device according to this invention is a particularly compact device and is thus also highly suited for machine tools with little available space.

For example, in a simple design and low-cost embodiment, the housing contains an inner housing part and an outer housing part securely attached to it such that an annular compression space for the pressure piston is defined. The leakage channel is formed preferably by bores which run parallel and perpendicular to the center axis of the housing. The bores can be sealed at their outward open ends by stopper plugs or drain screws or be connected to corresponding outlet lines.

Within the housing of the actuating device there is a rotary lead through for the inlet of a working fluid and/or cleaning fluid for the machine tool spindle which is rotating during operation. The rotary lead through is located preferably in a separate housing and can thus be installed or removed in a simple manner.

In addition, an air inlet channel for the cleaning of clamping surfaces or such can be provided in the housing of the actuating device.

BRIEF DESCRIPTION OF THE DRAWINGS

Additional details and advantages are indicated from the following description of one preferred design example with reference to the following figures.

DETAILED DESCRIPTION OF THE INVENTION

Figure 1:
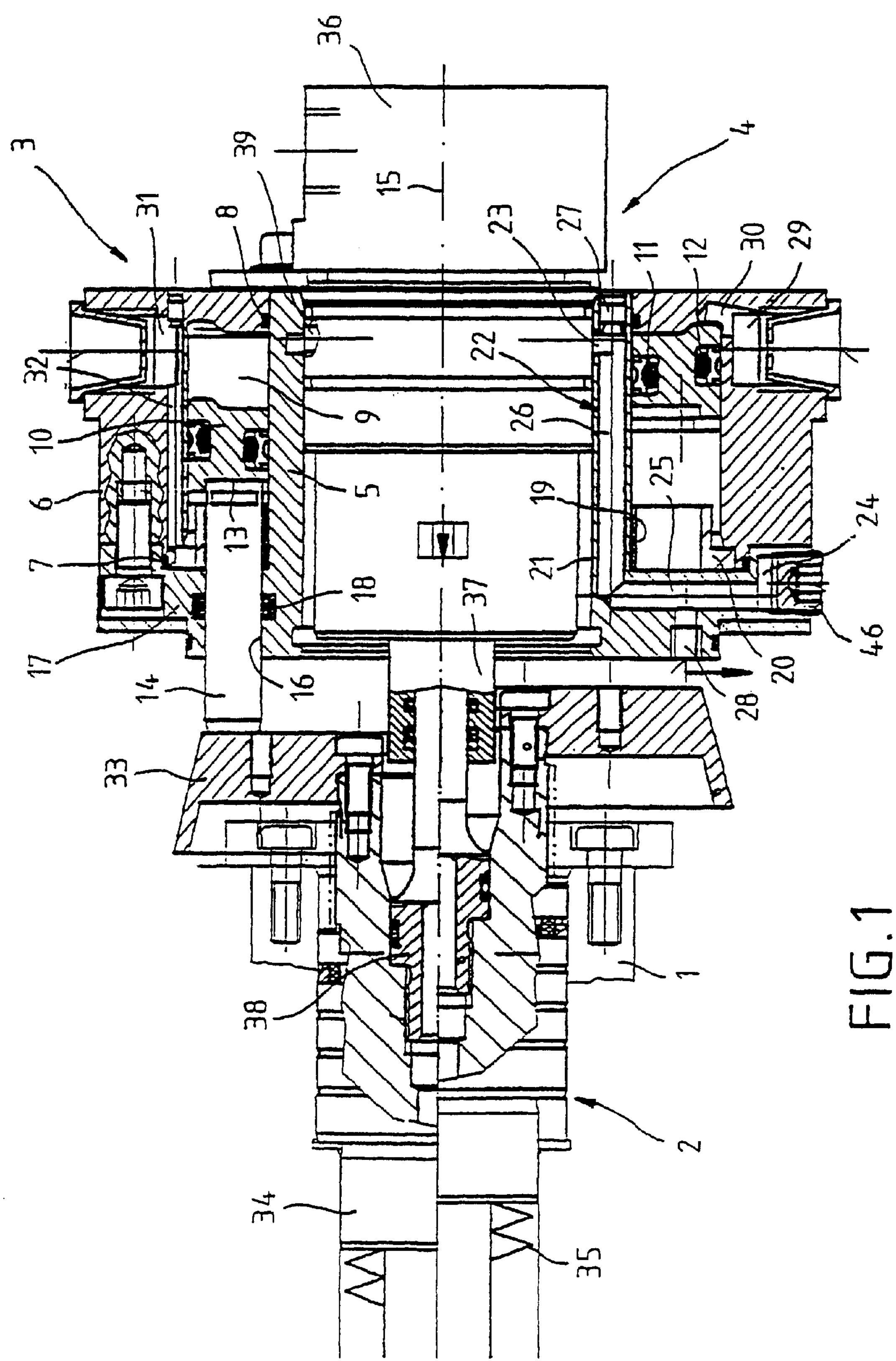
FIG. 1 is a portion of a tool tensioning jack with an actuating device according to this invention, presented in cross section.

FIG. 1 presents a part of a tool tensioning jack 2 built into a machine tool spindle 1 and an actuating device 3 with a so-called rotary lead through 4 for the inlet of a working fluid and/or cleaning fluid to the machine tool spindle 1. The illustrated parts of the tool tensioning jack 2 and of the actuating device 3 in the top half of FIG. 1 are shown in a release setting and in the lower half, in a tensioned setting.

As is evident in FIG. 1, the actuating device 3 contains a hollow, cylindrical housing which consists of an inner housing part 5 and an outer housing part 6 tightly screwed thereto. A pressure chamber 9 is bounded by the inner and outer housing part 5 and 6 and is sealed externally by means of gaskets 7 or 8. A ring-shaped pressure piston 10 can slide in an axial direction of the housing within this pressure chamber. The pressure piston 10 is sealed against the inner and outer wall of the ring-shaped compression chamber 9 by means of inner and outer sealing elements 11 and 12. The inner ends of several cylindrical pressure plungers 14 which are interspaced at the same angle in the circumferential direction are located at the front side 13 of the pressure piston 10 which front side is directed toward the tool tensioning jack 2. The other ends protrude outward from the housing in the release setting illustrated in the top half of FIG. 1. The pressure plungers 14 are located in several interspaced continuous bores 16 located concentrically around a center axis 15 of the housing in a radial flange 17 formed on the housing part 5, which flange forms one side wall of the housing. In addition, the pressure plungers 14 are sealed against the housing by suitable sealing rings 18 in the radial flange 17 and can be axially displaced in corresponding guide bores 19 of a guide ring 20 located within the compression chamber 9.

The housing part 5 equipped with a central bore opening 21 contains several leakage channels 22 which lead from a ring groove 23 at the inner wall of the bore opening 21 to an outlet opening 24 sealed by means of a screw 46 at the outer perimeter of the radial flange 17. The leakage channel 22 is formed by a section 25 in the radial flange 17, running transverse to the center axis 15 between two pressure plungers radially outward to the outlet opening 24, and by a section 26 at a right angle to it, and said section runs parallel to the center axis 15 between the inner wall of the bore opening 21 and the compression chamber 9. Preferably, the leakage channel 22 is produced by bores which run from the rear side and the outside of the housing part 5 and which are sealed by a stopper plug 27 or the screw 46. An additional drain bore 28 opens into the section 25 at the front side of the radial flange 17, which likewise can be sealed by a sealing screw.

At the perimeter wall of the outer housing part 6 there is a first, radial inlet opening 29 which leads via a bore 30 to a rear end of the ring-shaped compression chamber 9. Via the inlet opening 29 the ring-shaped pressure piston 10 can be supplied with hydraulic fluid as pressuring agent for extension of the pressure plunger 14. From a second radial inlet opening 31 at the housing part 6 another inlet bore 32 runs parallel to the center axis 15 and leads to the front end of the compression chamber 9. The pressure plunger 10 can be supplied with hydraulic fluid via the inlet opening 31 and the inlet bore 32 for retraction of the pressure plunger 14.

By means of the pressure plungers 14 actuated by the pressure piston 10, a pressure disk 33 is displaced which is attached to the rear end of a tension rod 34 equipped with a continuous bore. The tension rod 34 can be displaced axially within the operating spindle 1 and is tensioned by a schematically illustrated cup spring packet 35 in the tensioned position illustrated in the bottom half of FIG. 1. In this setting a tool installed in the tool spindle will be pulled into a cone by a tensioning jack (not shown). To release the tool, the pressure piston 10 is supplied with a compressed fluid via the first radial inlet opening 29 and the bore 30, and then it will be moved together with the pressure plungers 14 from the tensioned setting illustrated in the lower half of FIG. 1, into the released setting illustrated in the upper half of the figure. Thus, the tensioning rod 34 will be displaced to the left via the pressure ring 33 according to FIG. 1, and the cup spring packet 35 will be compressed. Thus, the tensioning jack located at the front end of the tension rod will release the tool.

For tensioning of the tool, the pressure piston 10 is supplied with compressed fluid via the second, radial inlet opening 31 and the inlet bore 32, and the pressure piston 10 will move back from its released setting into the tensioned setting and the tension rod 34 will be pulled back into the tensioned position under the effect of the cup spring packet 35. Thus, a tool installed in the tool spindle will be clamped by the clamping jack (not shown).

The rotary lead through 4 is located in the central passage opening 21. It contains a stationary connecting part 36 for connection of a fixed supply line and of a rotating connection pipe 37, which can slide axially with a hollow connecting part 38 and is sealed. The hollow connecting part 38 is screwed into the continuous bore of the tensioning rod 34. From the housing of the rotary lead through 4 a radial leakage bore 39 runs outward and it is in connection with the ring channel 23. The leakage fluid can be removed to the outside via this leakage bore and the leakage channel 22 from the interior of the rotary lead through 4.

Figure 3:
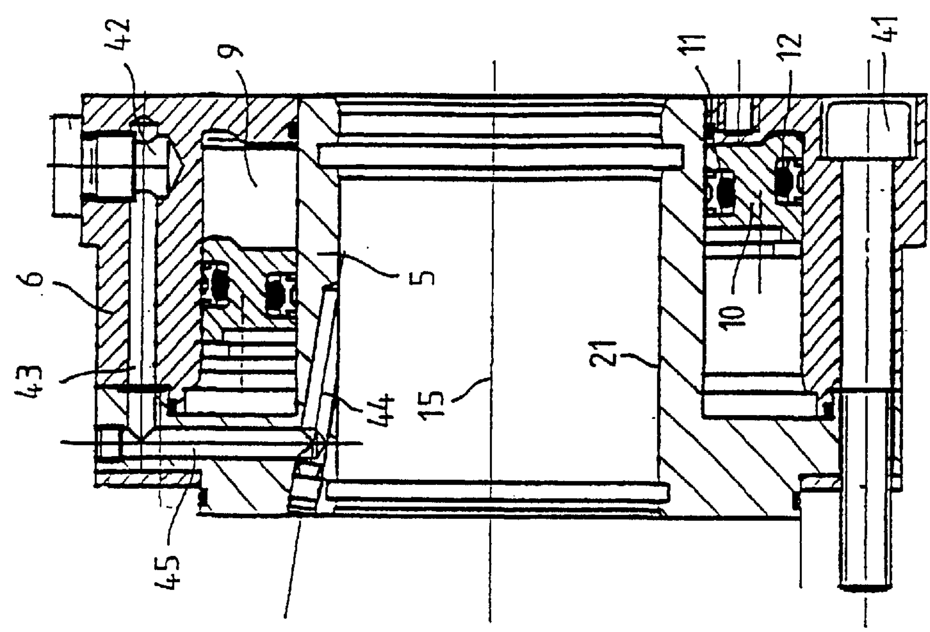
FIG. 3 is a cross sectional view of the actuating device in a plane offset to that presented in FIG. 1.
Figure 2:
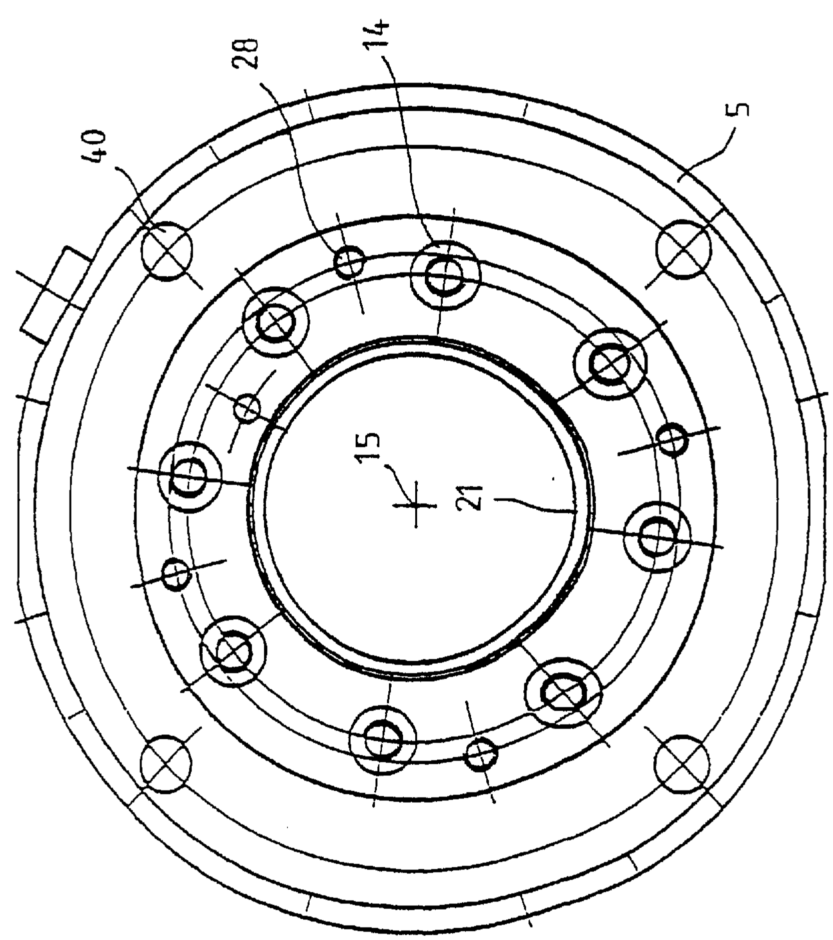
FIG. 2 is a side view of the actuating device illustrated in FIG. 1.

As is evident in FIG. 2, in the illustrated design eight pressure plungers 14 located coaxially to the center axis 15 of the housing are provided, together with four leakage channels 22 each offset to one another by 90 degrees and each provided with front-side outlet bore 28. The number of pressure plungers 14 and leakage channels 22 can be varied as desired. Four continuous bores 40 are supplied on the outside, each one for a screw 41 illustrated in FIG. 3, so that the housing can be secured to a spindle head or such. In addition, FIG. 3 shows an inlet channel for a cleaning fluid; this channel contains an inlet opening 42 positioned radially in the outer housing part 6, and an inlet bore 43 running parallel to the center axis 15, and also a radial bore 45 in the inner housing part 5. This radial bore is connected to the inlet bore and opens via a slanting inlet bore 44 at the inner wall of the passage opening 21. Cleaning air for cleaning of clamping surfaces or such can be supplied via this inlet channel.

Figure 4B:
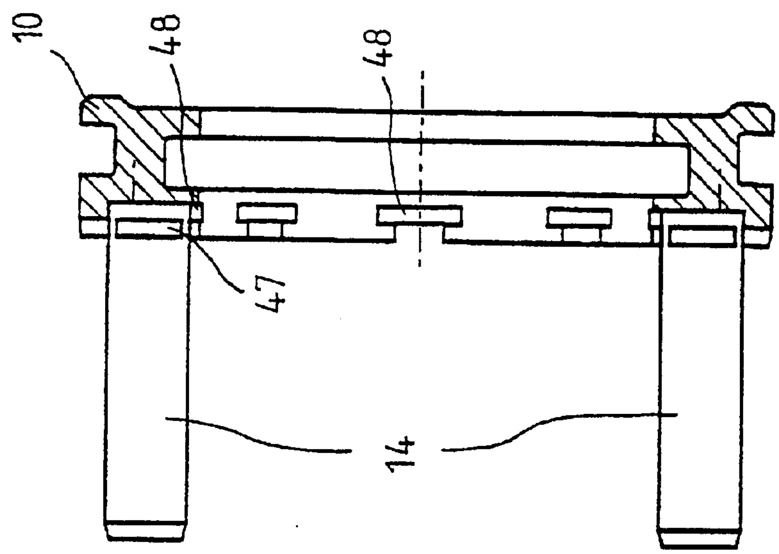
FIGS. 4A, 4B are an assembly of the pressure plunger to the pressure piston.
Figure 4A:
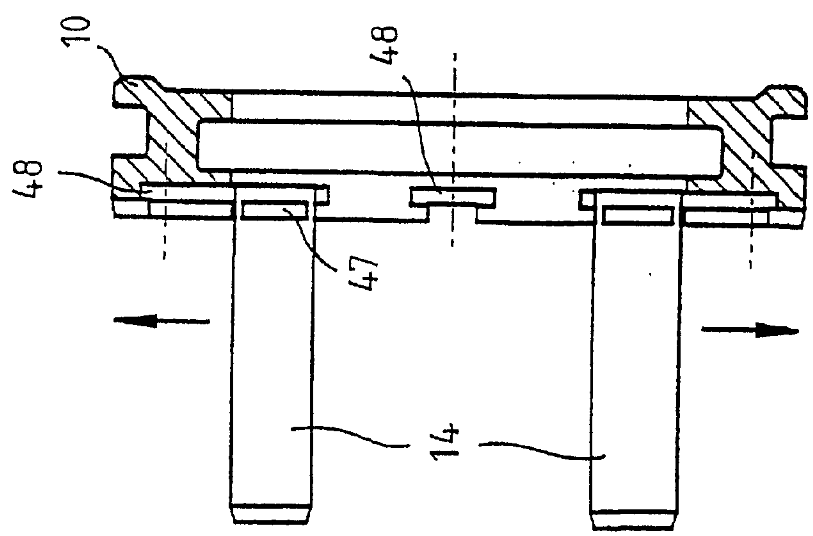

In FIGS. 4A and 4B we see the assembly of the pressure plungers 14 to the pressure piston 10. The cylindrical pressure plungers 14 have two mutually opposing flattened sides 47 on their ends facing the pressure piston 10 for insertion into corresponding T-grooves 48 at the front side of the pressure piston 10 directed toward the pressure plungers 14. The pressure plungers 14 can thus be inserted into the corresponding T-groove 48 by a simple displacement in the radial direction, as is shown in FIG. 4A. In the installed position illustrated according to FIG. 4B, the pressure plungers 14 can then be easily locked in place in the axial direction with respect to the pressure piston 10. In this manner, with little manufacturing expense, a fast and simple assembly of the pressure plungers to the pressure piston can be obtained.

The invention is characterized by a very compact design which allows a space-saving construction of an automatically actuated machine tool jack in a machine tool spindle.

However, the invention is not restricted to the illustrated design example. It can be employed in a corresponding manner, e.g., as an actuating device for a workpiece tensioning jack.

What is claimed is:

1. Actuating device for a tool or a workpiece tensioning jack in a machine tool spindle comprising:

a pressure piston located inside a housing for actuating the tool or workpiece tensioning jack and a fluid inlet element located in a central passage opening of the housing for the inlet of a fluid to the machine tool spindle, wherein:

a number of interspaced continuous bores are arranged concentrically around a center axis in a side wall of the housing, with pressure plungers axially displaceable with the aid of the pressure piston disposed therein;

the housing contains at least one leakage channel with a section extending between the pressure plungers in a radially outer direction;

and the fluid inlet element has an outlet opening in connection with the at least one leakage channel.

2. Actuating device according to claim 1 wherein the housing contains an inner housing part and an outer housing part securely attached thereto, thereby defining an annular compression space for the pressure piston.

3. Actuating device according to claim 2 wherein the inner housing part features a radial flange which forms the side wall with the continuous bores for the pressure plungers.

4. Actuating device according to claim 3 wherein the section of the leakage channel running radially outward is located in the radial flange.

5. Actuating device according to claim 2 wherein the at least one leakage channel runs in the inner housing part.

6. Actuating device according to claim 2 wherein the at least one leakage channel has a section within the compression space running parallel to the center axis.

7. Actuating device according to claim 2 wherein the housing includes an inlet channel for a cleaning fluid.

8. Actuating device according to claim 7 wherein the inlet channel has a radially positioned inlet opening and an inlet bore running parallel to the center axis in one outer housing part and a radial bore with a slanting inlet bore at one inner housing part.

9. Actuating device according to claim 1 wherein the pressure plungers are located concentrically about the center axis and equal-angle spaced apart.

10. Actuating device according to claim 1 wherein the housing contains plural leakage channels spaced concentrically about the center axis and equal-angle spaced apart.

11. Actuating device according to claim 1 wherein the pressure plungers have flattened areas for radial insertion into corresponding T-grooves at the pressure piston.

* * * * *